(12) United States Patent
Al-Ali et al.

(10) Patent No.: US 9,778,079 B1
(45) Date of Patent: Oct. 3, 2017

(54) PHYSIOLOGICAL MONITOR GAUGE PANEL

(71) Applicant: Masimo Corporation, Irvine, CA (US)

(72) Inventors: Ammar Al-Ali, San Juan Capistrano, CA (US); Bilal Muhsin, San Clemente, CA (US); Keith Indorf, Riverside, CA (US); Massi Joe E. Kiani, Laguna Niguel, CA (US)

(73) Assignee: MASIMO CORPORATION, Irvine, CA (US)

( * ) Notice: Subject to any disclaimer, the term of this patent is extended or adjusted under 35 U.S.C. 154(b) by 472 days.

(21) Appl. No.: 13/663,457

(22) Filed: Oct. 29, 2012

Related U.S. Application Data

(60) Provisional application No. 61/552,427, filed on Oct. 27, 2011.

(51) Int. Cl.
  *G01D 13/06*  (2006.01)

(52) U.S. Cl.
  CPC .................... *G01D 13/06* (2013.01)

(58) Field of Classification Search
  CPC ........ G01D 13/06; G01D 13/10; G01D 7/002; G01D 7/02; G01D 7/08
  USPC .................... 116/335, 334; 600/323
  See application file for complete search history.

(56) References Cited

U.S. PATENT DOCUMENTS

| 4,300,548 A * | 11/1981 | Jones .................... 128/204.21 |
|---|---|---|
| 4,960,128 A | 10/1990 | Gordon et al. |
| 4,964,408 A | 10/1990 | Hink et al. |
| 5,041,187 A | 8/1991 | Hink et al. |
| 5,069,213 A | 12/1991 | Polczynski |
| 5,163,438 A | 11/1992 | Gordon et al. |
| 5,319,355 A | 6/1994 | Russek |
| 5,337,744 A | 8/1994 | Branigan |
| 5,341,805 A | 8/1994 | Stavridi et al. |
| D353,195 S | 12/1994 | Savage et al. |
| D353,196 S | 12/1994 | Savage et al. |
| 5,377,676 A | 1/1995 | Vari et al. |
| D359,546 S | 6/1995 | Savage et al. |
| 5,431,170 A | 7/1995 | Mathews |
| D361,840 S | 8/1995 | Savage et al. |
| D362,063 S | 9/1995 | Savage et al. |
| 5,452,717 A | 9/1995 | Branigan et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |

(Continued)

OTHER PUBLICATIONS

US 8,845,543, 09/2014, Diab et al. (withdrawn)

(Continued)

*Primary Examiner* — Daniel S Larkin
*Assistant Examiner* — Irving A Campbell
(74) *Attorney, Agent, or Firm* — Knobbe, Martens, Olson & Bear LLP

(57) ABSTRACT

A physiological monitor gauge panel defines parameters to display on a physiological monitor via corresponding gauges. Gauge faces depict a range of parameter values for each of the parameters. An indicator designates a position on each gauge face corresponding to the current parameter value within the range of parameter values. The indicated position on each of the gauges is at the mid-point of each of the gauge faces when each of the parameters is at a nominal value.

8 Claims, 6 Drawing Sheets

(56) References Cited

U.S. PATENT DOCUMENTS

| | | |
|---|---|---|
| 5,490,505 A | 2/1996 | Diab et al. |
| 5,494,043 A | 2/1996 | O'Sullivan et al. |
| 5,533,511 A | 7/1996 | Kaspari et al. |
| 5,534,851 A | 7/1996 | Russek |
| 5,561,275 A | 10/1996 | Savage et al. |
| 5,562,002 A | 10/1996 | Lalin |
| 5,590,649 A | 1/1997 | Caro et al. |
| 5,602,924 A | 2/1997 | Durand et al. |
| 5,632,272 A | 5/1997 | Diab et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,685,299 A | 11/1997 | Diab et al. |
| D393,830 S | 4/1998 | Tobler et al. |
| 5,743,262 A | 4/1998 | Lepper, Jr. et al. |
| 5,758,644 A | 6/1998 | Diab et al. |
| 5,760,910 A | 6/1998 | Lepper, Jr. et al. |
| 5,769,785 A | 6/1998 | Diab et al. |
| 5,782,757 A | 7/1998 | Diab et al. |
| 5,785,659 A | 7/1998 | Caro et al. |
| 5,791,347 A | 8/1998 | Flaherty et al. |
| 5,810,734 A | 9/1998 | Caro et al. |
| 5,823,950 A | 10/1998 | Diab et al. |
| 5,830,131 A | 11/1998 | Caro et al. |
| 5,833,618 A | 11/1998 | Caro et al. |
| 5,860,919 A | 1/1999 | Kiani-Azarbayjany et al. |
| 5,890,929 A | 4/1999 | Mills et al. |
| 5,904,654 A | 5/1999 | Wohltmann et al. |
| 5,919,134 A | 7/1999 | Diab |
| 5,934,925 A | 8/1999 | Tobler et al. |
| 5,940,182 A | 8/1999 | Lepper, Jr. et al. |
| 5,995,855 A | 11/1999 | Kiani et al. |
| 5,997,343 A | 12/1999 | Mills et al. |
| 6,002,952 A | 12/1999 | Diab et al. |
| 6,011,986 A | 1/2000 | Diab et al. |
| 6,027,452 A | 2/2000 | Flaherty et al. |
| 6,036,642 A | 3/2000 | Diab et al. |
| 6,045,509 A | 4/2000 | Caro et al. |
| 6,067,462 A | 5/2000 | Diab et al. |
| 6,081,735 A | 6/2000 | Diab et al. |
| 6,088,607 A | 7/2000 | Diab et al. |
| 6,110,522 A | 8/2000 | Lepper, Jr. et al. |
| 6,124,597 A | 9/2000 | Shehada |
| 6,128,521 A | 10/2000 | Marro et al. |
| 6,129,675 A | 10/2000 | Jay |
| 6,144,868 A | 11/2000 | Parker |
| 6,151,516 A | 11/2000 | Kiani-Azarbayjany et al. |
| 6,152,754 A | 11/2000 | Gerhardt et al. |
| 6,157,850 A | 12/2000 | Diab et al. |
| 6,165,005 A | 12/2000 | Mills et al. |
| 6,184,521 B1 | 2/2001 | Coffin, IV et al. |
| 6,206,830 B1 | 3/2001 | Diab et al. |
| 6,229,856 B1 | 5/2001 | Diab et al. |
| 6,232,609 B1 | 5/2001 | Snyder et al. |
| 6,236,872 B1 | 5/2001 | Diab et al. |
| 6,241,683 B1 | 6/2001 | Macklem et al. |
| 6,253,097 B1 | 6/2001 | Aronow et al. |
| 6,256,523 B1 | 7/2001 | Diab et al. |
| 6,263,222 B1 | 7/2001 | Diab et al. |
| 6,278,522 B1 | 8/2001 | Lepper, Jr. et al. |
| 6,280,213 B1 | 8/2001 | Tobler et al. |
| 6,285,896 B1 | 9/2001 | Tobler et al. |
| 6,301,493 B1 | 10/2001 | Marro et al. |
| 6,317,627 B1 | 11/2001 | Ennen et al. |
| 6,321,100 B1 | 11/2001 | Parker |
| 6,325,761 B1 | 12/2001 | Jay |
| 6,334,065 B1 | 12/2001 | Al-Ali et al. |
| 6,343,224 B1 | 1/2002 | Parker |
| 6,349,228 B1 | 2/2002 | Kiani et al. |
| 6,360,114 B1 | 3/2002 | Diab et al. |
| 6,368,283 B1 | 4/2002 | Xu et al. |
| 6,371,921 B1 | 4/2002 | Caro et al. |
| 6,377,829 B1 | 4/2002 | Al-Ali |
| 6,388,240 B2 | 5/2002 | Schulz et al. |
| 6,397,091 B2 | 5/2002 | Diab et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,501,975 B2 | 12/2002 | Diab et al. |
| 6,505,059 B1 | 1/2003 | Kollias et al. |
| 6,515,273 B2 | 2/2003 | Al-Ali |
| 6,519,487 B1 | 2/2003 | Parker |
| 6,525,386 B1 | 2/2003 | Mills et al. |
| 6,526,300 B1 | 2/2003 | Kiani et al. |
| 6,541,756 B2 | 4/2003 | Schulz et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,595,316 B2 | 7/2003 | Cybulski et al. |
| 6,597,932 B2 | 7/2003 | Tian et al. |
| 6,597,933 B2 | 7/2003 | Kiani et al. |
| 6,606,511 B1 | 8/2003 | Ali et al. |
| 6,632,181 B2 | 10/2003 | Flaherty et al. |
| 6,639,668 B1 | 10/2003 | Trepagnier |
| 6,640,116 B2 | 10/2003 | Diab |
| 6,643,530 B2 | 11/2003 | Diab et al. |
| 6,650,917 B2 | 11/2003 | Diab et al. |
| 6,654,624 B2 | 11/2003 | Diab et al. |
| 6,658,276 B2 | 12/2003 | Kianl et al. |
| 6,661,161 B1 | 12/2003 | Lanzo et al. |
| 6,671,531 B2 | 12/2003 | Al-Ali et al. |
| 6,678,543 B2 | 1/2004 | Diab et al. |
| 6,684,090 B2 | 1/2004 | Ali et al. |
| 6,684,091 B2 | 1/2004 | Parker |
| 6,697,656 B1 | 2/2004 | Al-Ali |
| 6,697,657 B1 | 2/2004 | Shehada et al. |
| 6,697,658 B2 | 2/2004 | Al-Ali |
| RE38,476 E | 3/2004 | Diab et al. |
| 6,699,194 B1 | 3/2004 | Diab et al. |
| 6,714,804 B2 | 3/2004 | Al-Ali et al. |
| RE38,492 E | 4/2004 | Diab et al. |
| 6,721,582 B2 | 4/2004 | Trepagnier et al. |
| 6,721,585 B1 | 4/2004 | Parker |
| 6,725,075 B2 | 4/2004 | Al-Ali |
| 6,728,560 B2 | 4/2004 | Kollias et al. |
| 6,735,459 B2 | 5/2004 | Parker |
| 6,745,060 B2 | 6/2004 | Diab et al. |
| 6,760,607 B2 | 7/2004 | Al-All |
| 6,770,028 B1 | 8/2004 | Ali et al. |
| 6,771,994 B2 | 8/2004 | Kiani et al. |
| 6,792,300 B1 | 9/2004 | Diab et al. |
| 6,813,511 B2 | 11/2004 | Diab et al. |
| 6,816,741 B2 | 11/2004 | Diab |
| 6,822,564 B2 | 11/2004 | Al-Ali |
| 6,826,419 B2 | 11/2004 | Diab et al. |
| 6,830,711 B2 | 12/2004 | Mills et al. |
| 6,850,787 B2 | 2/2005 | Weber et al. |
| 6,850,788 B2 | 2/2005 | Al-Ali |
| 6,852,083 B2 | 2/2005 | Caro et al. |
| 6,861,639 B2 | 3/2005 | Al-Ali |
| 6,898,452 B2 | 5/2005 | Al-Ali et al. |
| 6,920,345 B2 | 7/2005 | Al-Ali et al. |
| 6,931,268 B1 | 8/2005 | Kiani-Azarbayjany et al. |
| 6,934,570 B2 | 8/2005 | Kiani et al. |
| 6,939,305 B2 | 9/2005 | Flaherty et al. |
| 6,943,348 B1 | 9/2005 | Coffin, IV |
| 6,950,687 B2 | 9/2005 | Al-Ali |
| 6,961,598 B2 | 11/2005 | Diab |
| 6,970,792 B1 | 11/2005 | Diab |
| 6,979,812 B2 | 12/2005 | Al-Ali |
| 6,985,764 B2 | 1/2006 | Mason et al. |
| 6,993,371 B2 | 1/2006 | Kiani et al. |
| 6,996,427 B2 | 2/2006 | Ali et al. |
| 6,999,904 B2 | 2/2006 | Weber et al. |
| 7,003,338 B2 | 2/2006 | Weber et al. |
| 7,003,339 B2 | 2/2006 | Diab et al. |
| 7,015,451 B2 | 3/2006 | Dalke et al. |
| 7,024,233 B2 | 4/2006 | Ali et al. |
| 7,027,849 B2 | 4/2006 | Al-Ali |
| 7,030,749 B2 | 4/2006 | Al-Ali |
| 7,039,449 B2 | 5/2006 | Al-Ali |
| 7,041,060 B2 | 5/2006 | Flaherty et al. |
| 7,044,918 B2 | 5/2006 | Diab |

(56) References Cited

U.S. PATENT DOCUMENTS

| | | |
|---|---|---|
| 7,067,893 B2 | 6/2006 | Mills et al. |
| 7,096,052 B2 | 8/2006 | Mason et al. |
| 7,096,054 B2 | 8/2006 | Abdul-Hafiz et al. |
| 7,132,641 B2 | 11/2006 | Schulz et al. |
| 7,142,901 B2 | 11/2006 | Kiani et al. |
| 7,149,561 B2 | 12/2006 | Diab |
| 7,186,966 B2 | 3/2007 | Al-Ali |
| 7,190,261 B2 | 3/2007 | Al-Ali |
| 7,215,984 B2 | 5/2007 | Diab |
| 7,215,986 B2 | 5/2007 | Diab |
| 7,221,971 B2 | 5/2007 | Diab |
| 7,225,006 B2 | 5/2007 | Al-Ali et al. |
| 7,225,007 B2 | 5/2007 | Al-Ali |
| RE39,672 E | 6/2007 | Shehada et al. |
| 7,239,905 B2 | 7/2007 | Kiani-Azarbayjany et al. |
| 7,245,953 B1 | 7/2007 | Parker |
| 7,254,429 B2 | 8/2007 | Schurman et al. |
| 7,254,431 B2 | 8/2007 | Al-Ali |
| 7,254,433 B2 | 8/2007 | Diab et al. |
| 7,254,434 B2 | 8/2007 | Schulz et al. |
| 7,272,425 B2 | 9/2007 | Al-Ali |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,295,866 B2 | 11/2007 | Al-Ali |
| 7,328,053 B1 | 2/2008 | Diab et al. |
| 7,332,784 B2 | 2/2008 | Mills et al. |
| 7,340,287 B2 | 3/2008 | Mason et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,355,512 B1 | 4/2008 | Al-Ali |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,373,194 B2 | 5/2008 | Weber et al. |
| 7,376,453 B1 | 5/2008 | Diab et al. |
| 7,377,794 B2 | 5/2008 | Al-Ali et al. |
| 7,377,899 B2 | 5/2008 | Weber et al. |
| 7,383,070 B2 | 6/2008 | Diab et al. |
| 7,415,297 B2 | 8/2008 | Al-Ali et al. |
| 7,428,432 B2 | 9/2008 | Ali et al. |
| 7,438,683 B2 | 10/2008 | Al-Ali et al. |
| 7,440,787 B2 | 10/2008 | Diab |
| 7,454,240 B2 | 11/2008 | Diab et al. |
| 7,467,002 B2 | 12/2008 | Weber et al. |
| 7,469,157 B2 | 12/2008 | Diab et al. |
| 7,471,969 B2 | 12/2008 | Diab et al. |
| 7,471,971 B2 | 12/2008 | Diab et al. |
| 7,483,729 B2 | 1/2009 | Al-Ali et al. |
| 7,483,730 B2 | 1/2009 | Diab et al. |
| 7,489,958 B2 | 2/2009 | Diab et al. |
| 7,496,391 B2 | 2/2009 | Diab et al. |
| 7,496,393 B2 | 2/2009 | Diab et al. |
| D587,657 S | 3/2009 | Al-Ali et al. |
| 7,499,741 B2 | 3/2009 | Diab et al. |
| 7,499,835 B2 | 3/2009 | Weber et al. |
| 7,500,950 B2 | 3/2009 | Al-Ali et al. |
| 7,509,154 B2 | 3/2009 | Diab et al. |
| 7,509,494 B2 | 3/2009 | Al-Ali |
| 7,510,849 B2 | 3/2009 | Schurman et al. |
| 7,526,328 B2 | 4/2009 | Diab et al. |
| 7,530,942 B1 | 5/2009 | Diab |
| 7,530,949 B2 | 5/2009 | Al Ali et al. |
| 7,530,955 B2 | 5/2009 | Diab et al. |
| 7,563,110 B2 | 7/2009 | Al-Ali et al. |
| 7,596,398 B2 | 9/2009 | Al-Ali et al. |
| 7,618,375 B2 | 11/2009 | Flaherty |
| D606,659 S | 12/2009 | Kiani et al. |
| 7,647,083 B2 | 1/2010 | Al-Ali et al. |
| D609,193 S | 2/2010 | Al-Ali et al. |
| D614,305 S | 4/2010 | Al-Ali et al. |
| RE41,317 E | 5/2010 | Parker |
| 7,729,733 B2 | 6/2010 | Al-Ali et al. |
| 7,734,320 B2 | 6/2010 | Al-Ali |
| 7,761,127 B2 | 7/2010 | Al-Ali et al. |
| 7,761,128 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| 7,801,581 B2 | 9/2010 | Diab |
| 7,822,452 B2 | 10/2010 | Schurman et al. |
| RE41,912 E | 11/2010 | Parker |
| 7,844,313 B2 | 11/2010 | Kiani et al. |
| 7,844,314 B2 | 11/2010 | Al-Ali |
| 7,844,315 B2 | 11/2010 | Al-Ali |
| 7,865,222 B2 | 1/2011 | Weber et al. |
| 7,873,497 B2 | 1/2011 | Weber et al. |
| 7,880,606 B2 | 2/2011 | Al-Ali |
| 7,880,626 B2 | 2/2011 | Al-Ali et al. |
| 7,891,355 B2 | 2/2011 | Al-Ali et al. |
| 7,894,868 B2 | 2/2011 | Al-Ali et al. |
| 7,899,507 B2 | 3/2011 | Al-Ali et al. |
| 7,899,518 B2 | 3/2011 | Trepagnier et al. |
| 7,904,132 B2 | 3/2011 | Weber et al. |
| 7,909,772 B2 | 3/2011 | Popov et al. |
| 7,910,875 B2 | 3/2011 | Al-Ali |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,937,130 B2 | 5/2011 | Diab et al. |
| 7,941,199 B2 | 5/2011 | Kiani |
| 7,951,086 B2 | 5/2011 | Flaherty et al. |
| 7,957,780 B2 | 6/2011 | Lamego et al. |
| 7,962,188 B2 | 6/2011 | Kiani et al. |
| 7,962,190 B1 | 6/2011 | Diab et al. |
| 7,976,472 B2 | 7/2011 | Kiani |
| 7,988,637 B2 | 8/2011 | Diab |
| 7,990,382 B2 | 8/2011 | Kiani |
| 7,991,446 B2 | 8/2011 | Ali et al. |
| 8,000,761 B2 | 8/2011 | Al-Ali |
| 8,008,088 B2 | 8/2011 | Bellott et al. |
| RE42,753 E | 9/2011 | Kiani-Azarbayjany et al. |
| 8,019,400 B2 | 9/2011 | Diab et al. |
| 8,028,701 B2 | 10/2011 | Al-Ali et al. |
| 8,029,765 B2 | 10/2011 | Bellott et al. |
| 8,036,727 B2 | 10/2011 | Schurman et al. |
| 8,036,728 B2 | 10/2011 | Diab et al. |
| 8,046,040 B2 | 10/2011 | Ali et al. |
| 8,046,041 B2 | 10/2011 | Diab et al. |
| 8,046,042 B2 | 10/2011 | Diab et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,126,528 B2 | 2/2012 | Diab et al. |
| 8,128,572 B2 | 3/2012 | Diab et al. |
| 8,130,105 B2 | 3/2012 | Al-Ali et al. |
| 8,145,287 B2 | 3/2012 | Diab et al. |
| 8,150,487 B2 | 4/2012 | Diab et al. |
| 8,175,672 B2 | 5/2012 | Parker |
| 8,180,420 B2 | 5/2012 | Diab et al. |
| 8,182,443 B1 | 5/2012 | Kiani |
| 8,185,180 B2 | 5/2012 | Diab et al. |
| 8,190,223 B2 | 5/2012 | Al-Ali et al. |
| 8,190,227 B2 | 5/2012 | Diab et al. |
| 8,203,438 B2 | 6/2012 | Kiani et al. |
| 8,203,704 B2 | 6/2012 | Merritt et al. |
| 8,204,566 B2 | 6/2012 | Schurman et al. |
| 8,219,172 B2 | 7/2012 | Schurman et al. |
| 8,224,411 B2 | 7/2012 | Al-Ali et al. |
| 8,228,181 B2 | 7/2012 | Al-Ali |
| 8,229,533 B2 | 7/2012 | Diab et al. |
| 8,233,955 B2 | 7/2012 | Al-Ali et al. |
| 8,244,325 B2 | 8/2012 | Al-Ali et al. |
| 8,255,026 B1 | 8/2012 | Al-Ali |
| 8,255,027 B2 | 8/2012 | Al-Ali et al. |
| 8,255,028 B2 | 8/2012 | Al-Ali et al. |
| 8,260,577 B2 | 9/2012 | Weber et al. |
| 8,265,723 B1 | 9/2012 | McHale et al. |
| 8,274,360 B2 | 9/2012 | Sampath et al. |
| 8,301,217 B2 | 10/2012 | Al-Ali et al. |

(56) References Cited

U.S. PATENT DOCUMENTS

| | | |
|---|---|---|
| 8,306,596 B2 | 11/2012 | Schurman et al. |
| 8,310,336 B2 | 11/2012 | Muhsin et al. |
| 8,315,683 B2 | 11/2012 | Al-Ali et al. |
| RE43,860 E | 12/2012 | Parker |
| 8,337,403 B2 | 12/2012 | Al-Ali et al. |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,359,080 B2 | 1/2013 | Diab et al. |
| 8,364,223 B2 | 1/2013 | Al-Ali et al. |
| 8,364,226 B2 | 1/2013 | Diab et al. |
| 8,374,665 B2 | 2/2013 | Lamego |
| 8,385,995 B2 | 2/2013 | Al-ali et al. |
| 8,385,996 B2 | 2/2013 | Smith et al. |
| 8,388,353 B2 | 3/2013 | Kiani et al. |
| 8,399,822 B2 | 3/2013 | Al-Ali |
| 8,401,602 B2 | 3/2013 | Kiani |
| 8,405,608 B2 | 3/2013 | Al-Ali et al. |
| 8,414,499 B2 | 4/2013 | Al-Ali et al. |
| 8,418,524 B2 | 4/2013 | Al-Ali |
| 8,423,106 B2 | 4/2013 | Lamego et al. |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,703 B2 | 6/2013 | Al-Ali |
| 8,457,707 B2 | 6/2013 | Kiani |
| 8,463,349 B2 | 6/2013 | Diab et al. |
| 8,466,286 B2 | 6/2013 | Bellott et al. |
| 8,471,713 B2 | 6/2013 | Poeze et al. |
| 8,473,020 B2 | 6/2013 | Kiani et al. |
| 8,483,787 B2 | 7/2013 | Al-Ali et al. |
| 8,489,364 B2 | 7/2013 | Weber et al. |
| 8,498,684 B2 | 7/2013 | Weber et al. |
| 8,504,128 B2 | 8/2013 | Blank et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| 8,529,301 B2 | 9/2013 | Al-Ali et al. |
| 8,532,727 B2 | 9/2013 | Ali et al. |
| 8,532,728 B2 | 9/2013 | Diab et al. |
| D692,145 S | 10/2013 | Al-Ali et al. |
| 8,547,209 B2 | 10/2013 | Kiani et al. |
| 8,548,548 B2 | 10/2013 | Al-Ali |
| 8,548,549 B2 | 10/2013 | Schurman et al. |
| 8,548,550 B2 | 10/2013 | Al-Ali et al. |
| 8,560,032 B2 | 10/2013 | Al-Ali et al. |
| 8,560,034 B1 | 10/2013 | Diab et al. |
| 8,570,167 B2 | 10/2013 | Al-Ali |
| 8,570,503 B2 | 10/2013 | Vo et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,581,732 B2 | 11/2013 | Al-Ali et al. |
| 8,584,345 B2 | 11/2013 | Al-Ali et al. |
| 8,588,880 B2 | 11/2013 | Abdul-Hafiz et al. |
| 8,600,467 B2 | 12/2013 | Al-Ali et al. |
| 8,606,342 B2 | 12/2013 | Diab |
| 8,626,255 B2 | 1/2014 | Al-Ali et al. |
| 8,630,691 B2 | 1/2014 | Lamego et al. |
| 8,634,889 B2 | 1/2014 | Al-Ali et al. |
| 8,641,631 B2 | 2/2014 | Sierra et al. |
| 8,652,060 B2 | 2/2014 | Al-Ali |
| 8,663,107 B2 | 3/2014 | Kiani |
| 8,666,468 B1 | 3/2014 | Al-Ali |
| 8,667,967 B2 | 3/2014 | Al-Ali et al. |
| 8,670,811 B2 | 3/2014 | O'Reilly |
| 8,670,814 B2 | 3/2014 | Diab et al. |
| 8,676,286 B2 | 3/2014 | Weber et al. |
| 8,682,407 B2 | 3/2014 | Al-Ali |
| RE44,823 E | 4/2014 | Parker |
| RE44,875 E | 4/2014 | Kiani et al. |
| 8,690,799 B2 | 4/2014 | Telfort et al. |
| 8,700,112 B2 | 4/2014 | Kiani |
| 8,702,627 B2 | 4/2014 | Telfort et al. |
| 8,706,179 B2 | 4/2014 | Parker |
| 8,712,494 B1 | 4/2014 | MacNeish, III et al. |
| 8,715,206 B2 | 5/2014 | Telfort et al. |
| 8,718,735 B2 | 5/2014 | Lamego et al. |
| 8,718,737 B2 | 5/2014 | Diab et al. |
| 8,718,738 B2 | 5/2014 | Blank et al. |
| 8,720,249 B2 | 5/2014 | Al-Ali |
| 8,721,541 B2 | 5/2014 | Al-Ali et al. |
| 8,721,542 B2 | 5/2014 | Al-Ali et al. |
| 8,723,677 B1 | 5/2014 | Kiani |
| 8,740,792 B1 | 6/2014 | Kiani et al. |
| 8,754,776 B2 | 6/2014 | Poeze et al. |
| 8,755,535 B2 | 6/2014 | Telfort et al. |
| 8,755,856 B2 | 6/2014 | Diab et al. |
| 8,755,872 B1 | 6/2014 | Marinow |
| 8,761,850 B2 | 6/2014 | Lamego |
| 8,764,671 B2 | 7/2014 | Kiani |
| 8,768,423 B2 | 7/2014 | Shakespeare et al. |
| 8,771,204 B2 | 7/2014 | Telfort et al. |
| 8,777,634 B2 | 7/2014 | Kiani et al. |
| 8,781,543 B2 | 7/2014 | Diab et al. |
| 8,781,544 B2 | 7/2014 | Al-Ali et al. |
| 8,781,549 B2 | 7/2014 | Al-Ali et al. |
| 8,788,003 B2 | 7/2014 | Schurman et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,831,700 B2 | 9/2014 | Schurman et al. |
| 8,840,549 B2 | 9/2014 | Al-Ali et al. |
| 8,847,740 B2 | 9/2014 | Kiani et al. |
| 8,849,365 B2 | 9/2014 | Smith et al. |
| 8,852,094 B2 | 10/2014 | Al-Ali et al. |
| 8,852,994 B2 | 10/2014 | Wojtczuk et al. |
| 8,868,147 B2 | 10/2014 | Stippick et al. |
| 8,868,150 B2 | 10/2014 | Al-Ali et al. |
| 8,870,792 B2 | 10/2014 | Al-Ali et al. |
| 8,886,271 B2 | 11/2014 | Kiani et al. |
| 8,888,539 B2 | 11/2014 | Al-Ali et al. |
| 8,888,708 B2 | 11/2014 | Diab et al. |
| 8,892,180 B2 | 11/2014 | Weber et al. |
| 8,897,847 B2 | 11/2014 | Al-Ali |
| 8,909,310 B2 | 12/2014 | Lamego et al. |
| 8,911,377 B2 | 12/2014 | Al-Ali |
| 8,912,909 B2 | 12/2014 | Al-Ali et al. |
| 8,920,317 B2 | 12/2014 | Al-Ali et al. |
| 8,921,699 B2 | 12/2014 | Al-Ali et al. |
| 8,922,382 B2 | 12/2014 | Al-Ali et al. |
| 8,929,964 B2 | 1/2015 | Al-Ali et al. |
| 8,942,777 B2 | 1/2015 | Diab et al. |
| 8,948,834 B2 | 2/2015 | Diab et al. |
| 8,948,835 B2 | 2/2015 | Diab |
| 8,965,471 B2 | 2/2015 | Lamego |
| 8,983,564 B2 | 3/2015 | Al-Ali |
| 8,989,831 B2 | 3/2015 | Al-Ali et al. |
| 8,996,085 B2 | 3/2015 | Kiani et al. |
| 8,998,809 B2 | 4/2015 | Kiani |
| 9,028,429 B2 | 5/2015 | Telfort et al. |
| 9,037,207 B2 | 5/2015 | Al-Ali et al. |
| 9,060,721 B2 | 6/2015 | Reichgott et al. |
| 9,066,666 B2 | 6/2015 | Kiani |
| 9,066,680 B1 | 6/2015 | Al-Ali et al. |
| 9,072,474 B2 | 7/2015 | Al-Ali et al. |
| 9,078,560 B2 | 7/2015 | Schurman et al. |
| 9,084,569 B2 | 7/2015 | Weber et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,107,626 B2 | 8/2015 | Al-Ali et al. |
| 9,113,831 B2 | 8/2015 | Al-Ali |
| 9,113,832 B2 | 8/2015 | Al-Ali |
| 9,119,595 B2 | 9/2015 | Lamego |
| 9,131,881 B2 | 9/2015 | Diab et al. |
| 9,131,882 B2 | 9/2015 | Al-Ali et al. |
| 9,131,883 B2 | 9/2015 | Al-Ali |
| 9,131,917 B2 | 9/2015 | Telfort et al. |
| 9,138,180 B1 | 9/2015 | Coverston et al. |

(56) References Cited

U.S. PATENT DOCUMENTS

| | | |
|---|---|---|
| 9,138,182 B2 | 9/2015 | Al-Ali et al. |
| 9,138,192 B2 | 9/2015 | Weber et al. |
| 9,142,117 B2 | 9/2015 | Muhsin et al. |
| 9,153,112 B1 | 10/2015 | Kiani et al. |
| 9,153,121 B2 | 10/2015 | Kiani et al. |
| 9,161,696 B2 | 10/2015 | Al-Ali et al. |
| 9,161,713 B2 | 10/2015 | Al-Ali et al. |
| 9,167,995 B2 | 10/2015 | Lamego et al. |
| 9,176,141 B2 | 11/2015 | Al-Ali et al. |
| 9,186,102 B2 | 11/2015 | Bruinsma et al. |
| 9,192,312 B2 | 11/2015 | Al-Ali |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,072 B2 | 12/2015 | Kiani |
| 9,211,095 B1 | 12/2015 | Al-Ali |
| 9,218,454 B2 | 12/2015 | Kiani et al. |
| 9,226,696 B2 | 1/2016 | Kiani |
| 9,241,662 B2 | 1/2016 | Al-Ali et al. |
| 9,245,668 B1 | 1/2016 | Vo et al. |
| 9,259,185 B2 | 2/2016 | Abdul-Hafiz et al. |
| 9,267,572 B2 | 2/2016 | Barker et al. |
| 9,277,880 B2 | 3/2016 | Poeze et al. |
| 9,289,167 B2 | 3/2016 | Diab et al. |
| 9,295,421 B2 | 3/2016 | Kiani et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,333,316 B2 | 5/2016 | Kiani |
| 9,339,220 B2 | 5/2016 | Lamego et al. |
| 9,341,565 B2 | 5/2016 | Lamego et al. |
| 2006/0074321 A1 | 4/2006 | Kouchi et al. |
| 2009/0043446 A1* | 2/2009 | Drew et al. ............ 701/33 |
| 2009/0046096 A1 | 2/2009 | Rampersad |
| 2009/0054743 A1 | 2/2009 | Stewart |
| 2009/0171167 A1 | 7/2009 | Baker, Jr. |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0261979 A1 | 10/2010 | Kiani |
| 2011/0001605 A1 | 1/2011 | Kiani et al. |
| 2011/0082711 A1 | 4/2011 | Poeze et al. |
| 2011/0105854 A1 | 5/2011 | Kiani et al. |
| 2011/0208015 A1 | 8/2011 | Welch et al. |
| 2011/0213212 A1 | 9/2011 | Al-Ali |
| 2011/0227927 A1* | 9/2011 | Garmon et al. ............ 345/440 |
| 2011/0230733 A1 | 9/2011 | Al-Ali |
| 2011/0237911 A1 | 9/2011 | Lamego et al. |
| 2012/0059267 A1 | 3/2012 | Lamego et al. |
| 2012/0116175 A1 | 5/2012 | Al-Ali et al. |
| 2012/0179006 A1 | 7/2012 | Jansen et al. |
| 2012/0209082 A1 | 8/2012 | Al-Ali |
| 2012/0209084 A1 | 8/2012 | Olsen et al. |
| 2012/0227739 A1 | 9/2012 | Kiani |
| 2012/0283524 A1 | 11/2012 | Kiani et al. |
| 2012/0296178 A1 | 11/2012 | Lamego et al. |
| 2012/0319816 A1 | 12/2012 | Al-Ali |
| 2012/0330112 A1 | 12/2012 | Lamego et al. |
| 2013/0023775 A1 | 1/2013 | Lamego et al. |
| 2013/0041591 A1 | 2/2013 | Lamego |
| 2013/0045685 A1 | 2/2013 | Kiani |
| 2013/0046204 A1 | 2/2013 | Lamego et al. |
| 2013/0060147 A1 | 3/2013 | Welch et al. |
| 2013/0096405 A1 | 4/2013 | Garfio |
| 2013/0096936 A1 | 4/2013 | Sampath et al. |
| 2013/0109935 A1 | 5/2013 | Al-Ali et al. |
| 2013/0162433 A1 | 6/2013 | Muhsin et al. |
| 2013/0190581 A1 | 7/2013 | Al-Ali et al. |
| 2013/0197328 A1 | 8/2013 | Diab et al. |
| 2013/0211214 A1 | 8/2013 | Olsen |
| 2013/0243021 A1 | 9/2013 | Siskavich |
| 2013/0253334 A1 | 9/2013 | Al-Ali et al. |
| 2013/0274571 A1 | 10/2013 | Diab et al. |
| 2013/0296672 A1 | 11/2013 | O'Neil et al. |
| 2013/0317370 A1 | 11/2013 | Dalvi et al. |
| 2013/0324808 A1 | 12/2013 | Al-Ali et al. |
| 2013/0331670 A1 | 12/2013 | Kiani |
| 2013/0338461 A1 | 12/2013 | Lamego et al. |
| 2014/0012100 A1 | 1/2014 | Al-Ali et al. |
| 2014/0025306 A1 | 1/2014 | Weber et al. |
| 2014/0034353 A1 | 2/2014 | Al-Ali et al. |
| 2014/0051953 A1 | 2/2014 | Lamego et al. |
| 2014/0058230 A1 | 2/2014 | Abdul-Hafiz et al. |
| 2014/0066783 A1 | 3/2014 | Kiani et al. |
| 2014/0077956 A1 | 3/2014 | Sampath et al. |
| 2014/0081100 A1 | 3/2014 | Muhsin et al. |
| 2014/0081175 A1 | 3/2014 | Telfort |
| 2014/0094667 A1 | 4/2014 | Schurman et al. |
| 2014/0100434 A1 | 4/2014 | Diab et al. |
| 2014/0114199 A1 | 4/2014 | Lamego et al. |
| 2014/0120564 A1 | 5/2014 | Workman et al. |
| 2014/0121482 A1 | 5/2014 | Merritt et al. |
| 2014/0121483 A1 | 5/2014 | Kiani |
| 2014/0127137 A1 | 5/2014 | Bellott et al. |
| 2014/0128696 A1 | 5/2014 | Al-Ali |
| 2014/0128699 A1 | 5/2014 | Al-Ali et al. |
| 2014/0129702 A1 | 5/2014 | Lamego et al. |
| 2014/0135588 A1 | 5/2014 | Al-Ali et al. |
| 2014/0142401 A1 | 5/2014 | Al-Ali et al. |
| 2014/0142402 A1 | 5/2014 | Al-Ali et al. |
| 2014/0163344 A1 | 6/2014 | Al-Ali |
| 2014/0163402 A1 | 6/2014 | Lamego et al. |
| 2014/0166076 A1 | 6/2014 | Kiani et al. |
| 2014/0171763 A1 | 6/2014 | Diab |
| 2014/0180038 A1 | 6/2014 | Kiani |
| 2014/0180154 A1 | 6/2014 | Sierra et al. |
| 2014/0194709 A1 | 7/2014 | Al-Ali et al. |
| 2014/0194711 A1 | 7/2014 | Al-Ali |
| 2014/0194766 A1 | 7/2014 | Al-Ali et al. |
| 2014/0206963 A1 | 7/2014 | Al-Ali |
| 2014/0213864 A1 | 7/2014 | Abdul-Hafiz et al. |
| 2014/0243627 A1 | 8/2014 | Diab et al. |
| 2014/0266790 A1 | 9/2014 | Al-Ali et al. |
| 2014/0275808 A1 | 9/2014 | Poeze et al. |
| 2014/0275835 A1 | 9/2014 | Lamego et al. |
| 2014/0275871 A1 | 9/2014 | Lamego et al. |
| 2014/0275872 A1 | 9/2014 | Merritt et al. |
| 2014/0275881 A1 | 9/2014 | Lamego et al. |
| 2014/0288400 A1 | 9/2014 | Diab et al. |
| 2014/0296664 A1 | 10/2014 | Bruinsma et al. |
| 2014/0303520 A1 | 10/2014 | Telfort et al. |
| 2014/0309506 A1 | 10/2014 | Lamego et al. |
| 2014/0316228 A1 | 10/2014 | Blank et al. |
| 2014/0323825 A1 | 10/2014 | Al-Ali et al. |
| 2014/0330092 A1 | 11/2014 | Al-Ali et al. |
| 2014/0330098 A1 | 11/2014 | Merritt et al. |
| 2014/0330099 A1 | 11/2014 | Al-Ali et al. |
| 2014/0333440 A1 | 11/2014 | Kiani |
| 2014/0336481 A1 | 11/2014 | Shakespeare et al. |
| 2014/0343436 A1 | 11/2014 | Kiani |
| 2015/0018650 A1 | 1/2015 | Al-Ali et al. |

OTHER PUBLICATIONS

Non-Patent Literature MVP-50P, found at http://www.buy-ei.com/Pages/MVP/MVP-50P_Overview.html, accessed Dec. 28, 2014, archived Apr. 22, 2009.*

Non-Patent Literature BMI Scale, titled "How to Translate BMI into Pounds: Finally, a Body Mass Index Calculator for the Rest of Us", accessed at http://web.archive.org/web/20080620122802/http://www.prweb.com/releases/2005/07/prweb262133.htm, archived on Jun. 20, 2008.*

Non-Patent Literature MVP-50P-2, titled MVP-50P Instrument Marking Requirements for Certified Aircraft, found at http://web.archive.org/web/20090306210759/http://www.buy-ei.com/Information/Redlines_Limits_MVP.pdf and archived on Mar. 6, 2009.*

(56) References Cited

OTHER PUBLICATIONS

Non-Patent Literature EXCEL Univariate, found at http://web.archive.org/web/20090228103558/http://cameron.econ.ucdavis.edu/excel/ex11histogram.html and archived on Feb. 29, 2009.*

* cited by examiner

PHYSIOLOGICAL MONITOR GAUGE PANEL

CROSS-REFERENCE TO RELATED APPLICATIONS

The present application claims priority benefit under 35 U.S.C. §119(e) to U.S. Provisional Patent Application Ser. No. 61/552,427, filed Oct. 27, 2011, titled Physiological Monitor Gauge Panel, the above-cited provisional application hereby incorporated in its entirety by reference herein.

BACKGROUND OF THE INVENTION

Pulse oximetry is a widely accepted noninvasive procedure for measuring the oxygen saturation level of arterial blood, an indicator of a person's oxygen supply. A typical pulse oximetry system utilizes an optical sensor attached to a fingertip to measure the relative volume of oxygenated hemoglobin in pulsatile arterial blood flowing within the fingertip. Oxygen saturation ($SpO_2$), pulse rate and a plethysmograph waveform, which is a visualization of pulsatile blood flow over time, are displayed on a monitor accordingly.

Conventional pulse oximetry assumes that arterial blood is the only pulsatile blood flow in the measurement site. During patient motion, venous blood also moves, which causes errors in conventional pulse oximetry. Advanced pulse oximetry processes the venous blood signal so as to report true arterial oxygen saturation and pulse rate under conditions of patient movement. Advanced pulse oximetry also functions under conditions of low perfusion (small signal amplitude), intense ambient light (artificial or sunlight) and electrosurgical instrument interference, which are scenarios where conventional pulse oximetry tends to fail.

Advanced pulse oximetry is described in at least U.S. Pat. Nos. 6,770,028; 6,658,276; 6,157,850; 6,002,952; 5,769,785 and 5,758,644, which are assigned to Masimo Corporation ("Masimo") of Irvine, Calif. and are incorporated in their entirety by reference herein. Corresponding low noise optical sensors are disclosed in at least U.S. Pat. Nos. 6,985,764; 6,813,511; 6,792,300; 6,256,523; 6,088,607; 5,782,757 and 5,638,818, which are also assigned to Masimo and are also incorporated in their entirety by reference herein. Advanced pulse oximetry systems including Masimo SET® low noise optical sensors and read through motion pulse oximetry monitors for measuring $SpO_2$, pulse rate (PR) and perfusion index (PI) are available from Masimo. Optical sensors include any of Masimo LNOP®, LNCS®, SofTouch™ and Blue™ adhesive or reusable sensors. Pulse oximetry monitors include any of Masimo Rad-8®, Rad-5®, Rad®-5v or SatShare® monitors.

Advanced blood parameter measurement systems are described in at least U.S. Pat. No. 7,647,083, filed Mar. 1, 2006, titled Multiple Wavelength Sensor Equalization; U.S. Pat. No. 7,729,733, filed Mar. 1, 2006, titled Configurable Physiological Measurement System; U.S. Pat. Pub. No. 2006/0211925, filed Mar. 1, 2006, titled Physiological Parameter Confidence Measure and U.S. Pat. Pub. No. 2006/0238358, filed Mar. 1, 2006, titled Noninvasive Multi-Parameter Patient Monitor, all assigned to Cercacor Laboratories, Inc., Irvine, Calif. (Cercacor) and all incorporated in their entirety by reference herein. Advanced blood parameter measurement systems include Masimo Rainbow® SET, which provides measurements in addition to $SpO_2$, such as total hemoglobin (SpHb™), oxygen content (SpOC™), methemoglobin (SpMet®), carboxyhemoglobin (SpCO®) and PVI®. Advanced blood parameter sensors include Masimo Rainbow® adhesive, ReSposable™ and reusable sensors. Advanced blood parameter monitors include Masimo Radical-7™, Rad87™ and Rad57™, Pronto-7® and Pronto® monitors, all available from Masimo. Such advanced pulse oximeters, low noise sensors and advanced blood parameter systems have gained rapid acceptance in a wide variety of medical applications, including surgical wards, intensive care and neonatal units, general wards, home care, physical training, and virtually all types of monitoring scenarios.

SUMMARY OF THE INVENTION

A physiological monitor gauge panel displays a graphical user interface (GUI) that allows medical care providers to quickly view and immediately and intuitively recognize and assess patient status across multiple parameters. The GUI comprises multiple gauges arranged in a panel. In an embodiment, a face of each gauge is configured as a circular portion. A needle of each gauge rotatably moves across the gauge face so as to indicate a parameter value. A gauge readout integrated with the gauge face also indicates a parameter value. An alarm region is disposed along at least one end of the face so as to indicate a lower alarm limit, an upper alarm limit or both lower and upper alarm limits. The alarm region becomes brightly illuminated when the needle is within the alarm region so as to alert a caregiver of an alarm condition.

In an embodiment, the physiological monitor gauge has a gauge face with generally semi-circular upper and lower edges defining downward-oriented ends and a mid-point between the ends defining an arced peak. Positions along the gauge face correspond to physiological parameter values. An indicator is disposed on the gauge face and is moveable along the gauge face according to a parameter value. The parameter value is displayed as at least one digit underneath the arced peak. The parameter type is specified under the parameter value.

One aspect of a physiological monitor gauge panel has a gauge face with generally semi-circular upper and lower edges. Each edge has downward-oriented ends and a mid-point defining an arced peak. Positions along the gauge face correspond to parameter values. An indicator is disposed on the gauge face and is moveable along the gauge face according to parameter values. At least one digit is displayed underneath the arced peak according to parameter values, and a parameter type is displayed under the at least one digit. In various embodiments, a generally arced color bar is disposed along the gauge face proximate at least one of the ends. The color bar defines an alarm region for parameter values. An arced histogram is disposed above the gauge face upper edge having bins, each of which generally represent parameter values corresponding to bin positions along the gauge face. Bin fills are depicted as relatively dark lines of various lengths coextending with particular ones of the bins. The bin fills each depict the amount of time the indicator persists at a given parameter value associated with a bin position.

Further aspect of a physiological monitor gauge panel are an alarm condition corresponding to the indicator positioned over the color bar. The gauge face changes from a generally neutral color to a red color during the alarm condition. Parameter value digits change from a black color to a white color during the alarm condition, and a background of the parameter value changes to a generally red color. A ghost face represents an unused quarter-circle region proximate one of the gauge face ends. A second generally arced color bar is located proximate the color bar and defines a cautionary region for parameter values. Gauge faces and corresponding indicators, parameter values and parameter types define a panel of parameter gauges. The indicators of each parameter gauge are generally centered at each of the arced peaks of the gauge faces so as to designate generally nominal values for the underlying physiological parameters. The panel displaying one or more significantly off-centered indicators signifies a potentially significant physiological event.

Another aspect of a physiological monitor gauge panel defines parameters to display on a physiological monitor via corresponding gauges. Gauge faces depict a range of parameter values for each of the parameters. An indicator designates a position on each gauge face corresponding to the current parameter value within the range of parameter values. The indicated position on each of the gauges is at the mid-point of each of the gauge faces when each of the parameters is at a nominal value. In various embodiments, gauge faces define a semi-circular range for each parameter. A low-range gauge has a left quarter-circle active face portion and a right quarter-circle inactive face portion. A high-range gauge has a right quarter-circle active face portion and a left quarter-circle inactive face portion. A high/low-range gauge has both a right quarter-circle active face portion and a left quarter-circle active face portion. A color bar designates an alarm region of parameter values. A second color bar designates a cautionary region of parameter values.

Yet another aspect of a physiological monitor gauge is a gauge face for depicting a range of values of a parameter on a physiological monitor. An indicator rotatably moves along the gauge face in response to the parameter so as to designate a current value for the parameter. The gauge face is configured so that the indicator is centered on the gauge face when the parameter current value is a nominal value. In various embodiments, the gauge face has a left-sided active face when the parameter has alarm limits for only low parameter values and a right-sided active face when the parameter has alarm limits for only high parameter values. The gauge face has both a left-sided active face and a right-sided active face when the parameter has alarm limits for both low parameter values and high parameter values. An active histogram is disposed proximate the active face for indicating the amount of time the indicator persists at a given parameter value. A virtual sliding knob sets the alarm limits along the gauge face.

DETAILED DESCRIPTION OF THE PREFERRED EMBODIMENTS

Figure 1:
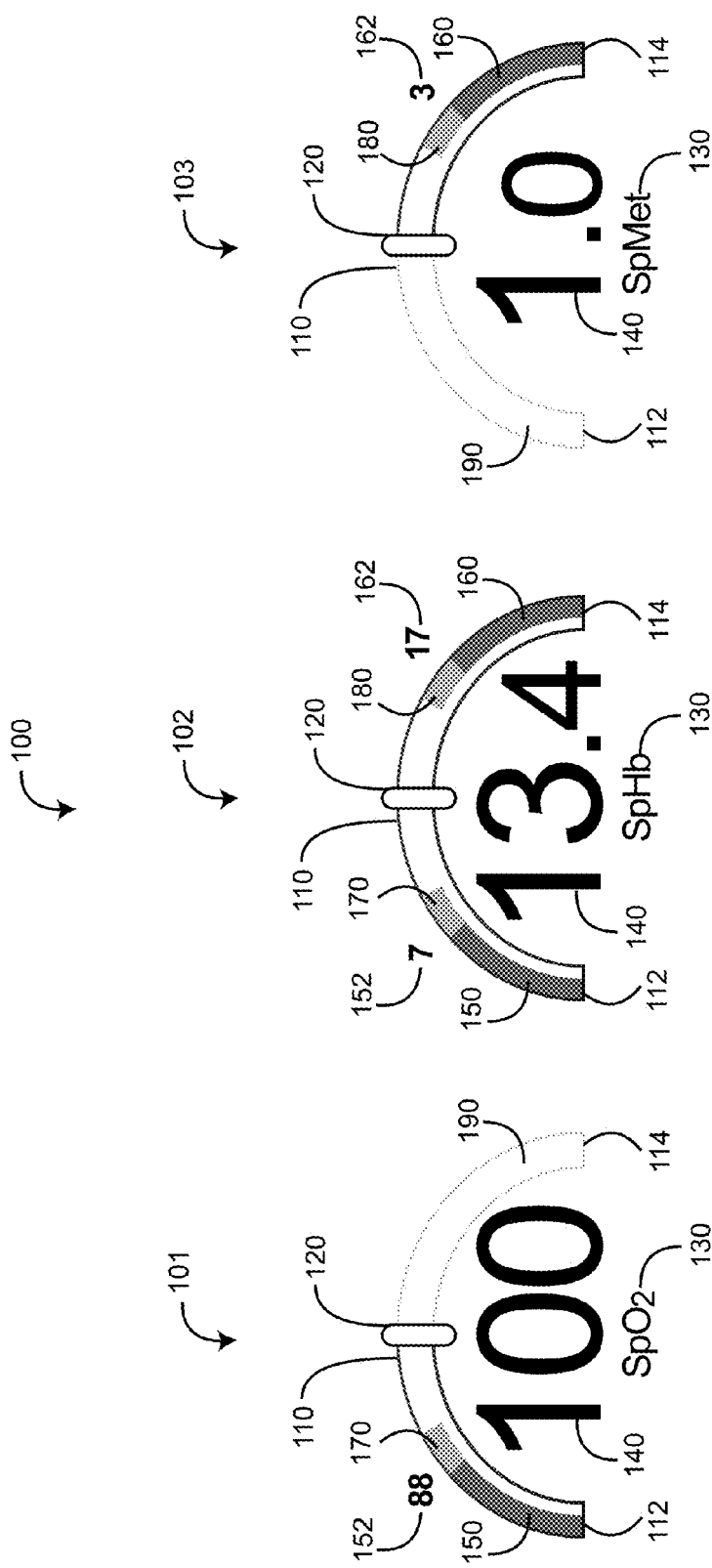
FIG. 1 is a physiological monitor gauge panel illustration presenting nominal values for each parameter and dual (red and yellow zone) alarm limits.

FIG. 1 illustrates a physiological monitor gauge panel 100 embodiment configured as a GUI (graphical user interface) presented on a monitor display. The gauge panel 100 is depicted as displaying nominal values for each parameter, as described below. Advantageously, a GUI gauge panel presentation of physiological parameters allows medical care providers to quickly view and immediately and intuitively recognize and assess patient status across multiple parameters. Indeed, a familiarity with reading of electrical/mechanical needle gauges is acquired over a lifetime exposure to speedometers, thermometers, tachometers and fuel-level indicators, to name a few.

An exemplar gauge panel configuration displays three half-circle gauges including a $SpO_2$ (oxygen saturation) gauge 101, a SpHb (total hemoglobin) gauge 102 and a SpMet (methemoglobin) gauge 103. Each gauge has a semi-circular face 110 and a parameter value indicator 120 that rotatably travels along each face 110. In particular, each indicator 120 is a visible tip terminating an apparent (unseen) needle that extends from, and rotatably pivots around, a gauge center. See, e.g., FIG. 7, below, illustrating visible needle. The indicator 120 position on the face 110 matches the value of a digital parameter readout 140 of the indicated parameter value. Advantageously, each gauge 101, 102, 103 is configured so that the indicator 120 is at the face mid-point, i.e. straight up as depicted, when the parameter is at a nominal value. In this manner, a caregiver will immediately recognize a patient having one or more abnormal readings and the degree of abnormality across multiple parameters.

As shown in FIG. 1, a low-range-alarm gauge 101 is configured for parameters having alarm limits for only low parameter values. A high-range-alarm gauge 103 is configured for parameters having alarm limits for only high parameter values. A high/low-range-alarm gauge 102 is configured for parameters having alarm limits for both low and high parameter values.

Also shown in FIG. 1, a low-range-alarm gauge 101 embodiment is configured with a left quarter-circle active face 112 depicting a possible range of parameter values. A right quarter-circle inactive face 114 is unused. In an embodiment, the inactive face is depicted as a ghost face, e.g. with a thin or light outline, as shown. In other embodiments, the inactive face is not shown, i.e. the gauge 101 has a quarter-circle face, as described with respect to FIG. 8, below. An alarm region is designated by a curved color bar 150 proximate a low-value range 112 of the face 110. A numerical indicator 152 indicates the maximum value of the alarm region. In an embodiment, the color bar 150 is red. In an embodiment, a second color bar 170 indicates a cautionary region. In an embodiment, the second color bar 170 is yellow.

Further shown in FIG. 1, a high-range-alarm gauge 103 embodiment is configured with a right quarter-circle active face 114 depicting a possible range of parameter values. A left quarter-circle inactive face 112 is unused. In an embodiment, the inactive face is depicted as a ghost face 190 as shown. In other embodiments, the inactive face is not shown. An alarm region is designated by a curved color bar 160 (e.g. red) proximate a high-value range 114 of the face 110. A numerical indicator 162 indicates the minimum value of the alarm region. In an embodiment, a second color bar 180 (e.g. yellow) indicates a cautionary region.

Additionally shown in FIG. 1, a low/high-range-alarm gauge 102 embodiment is configured with a semi-circle active face 112, 114 depicting a possible range of parameter values. A left quarter-circle active face 112 illustrates high range values and a right quarter-circle active face 114 illustrates low range values. Alarm regions are designated by a curved (red) color bars 150, 160 at the high and low parameter ranges, respectively. Numerical indicators 152, 162 indicate the alarm onset regions. In an embodiment, a second (yellow) color bars 170, 180 indicates cautionary regions. In an embodiment, the parameter value indicator 120 is a brightly illuminated white.

Figure 2:
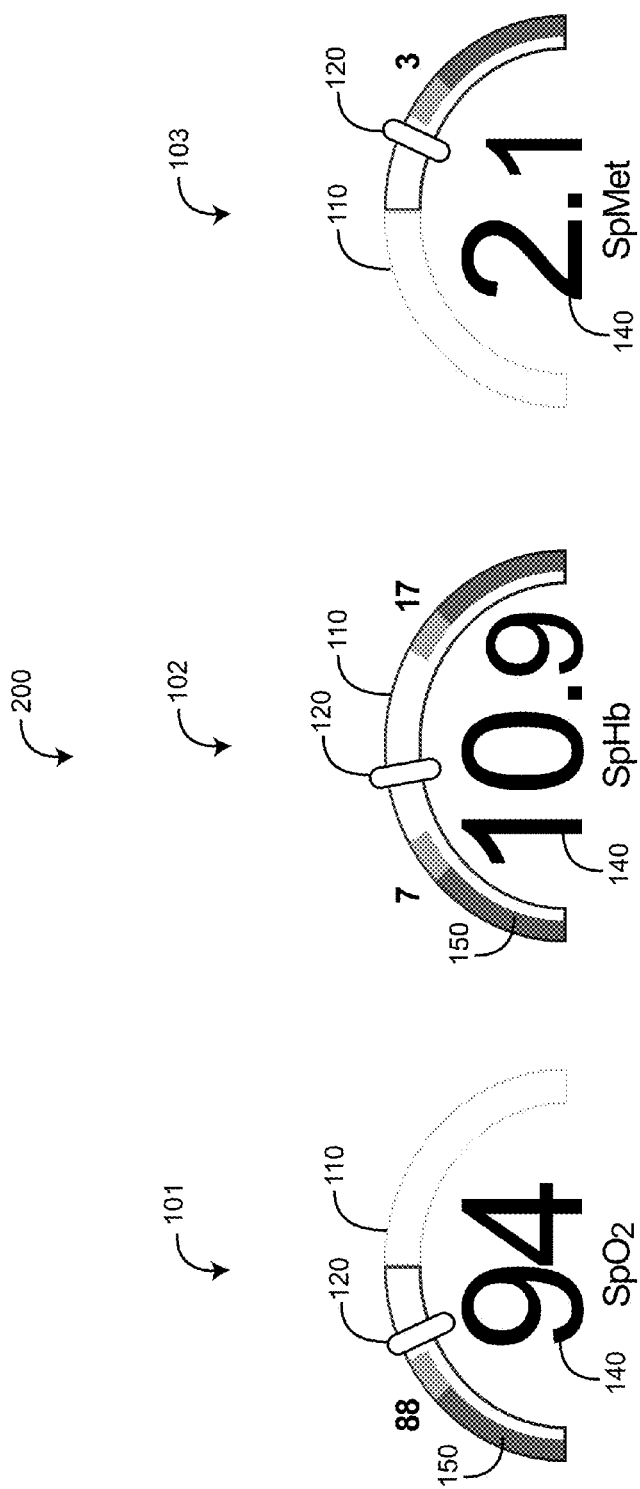
FIG. 2 is a physiological monitor gauge panel illustration presenting less than nominal values for each parameter.

FIG. 2 illustrates a physiological monitor gauge panel 200 presenting less than nominal values for each parameter. In particular, each gauge 101, 102, 103 has an indicator located away from a vertical (straight-up) position, as compared with the panel 100 (FIG. 1), described above. Advantageously, the off-vertical indicators 120 immediate signal a caregiver of one or more abnormal readings and the degree of abnormality across multiple parameters.

Figure 3:
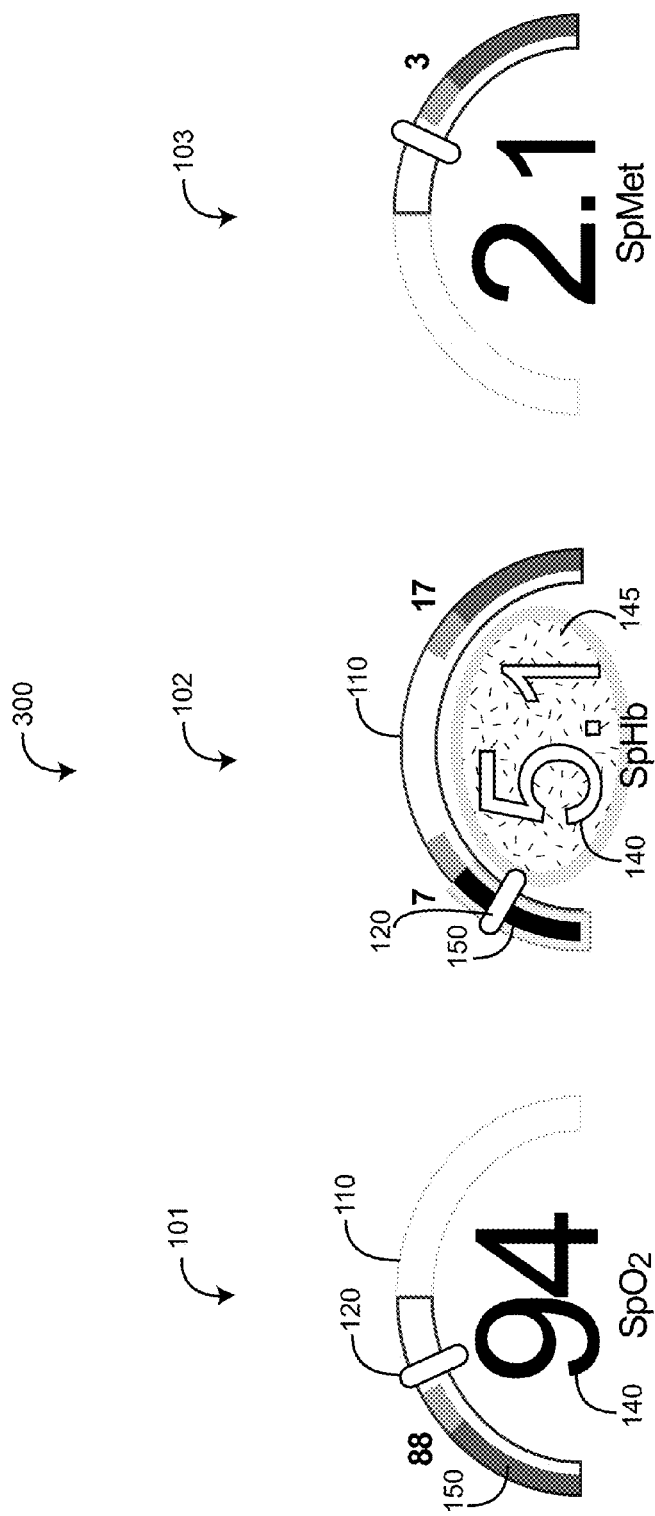
FIG. 3 is a physiological monitor gauge panel illustration presenting an alarm condition for a particular parameter.

FIG. 3 illustrates a physiological monitor gauge panel 300 presenting an SpHb parameter gauge 101 that indicates an alarm condition. In particular, the gauge indicator 120 and readout 140 indicate SpHb has dropped below a listed limit of 7. In an embodiment, the alarm condition is advantageously indicated by the red color bar 150 changing to a brightest red illumination and also glowing red, the numerical value 140 changing to solid white, the color of the face 110 border changing to red and the readout background 145 changing to a bright red illumination and also having a red glow. Advantageously, these various visual cues allow a caregiver to quickly recognize the alarming parameter and the severity of the underlying physiological condition of the patient.

Figure 4:
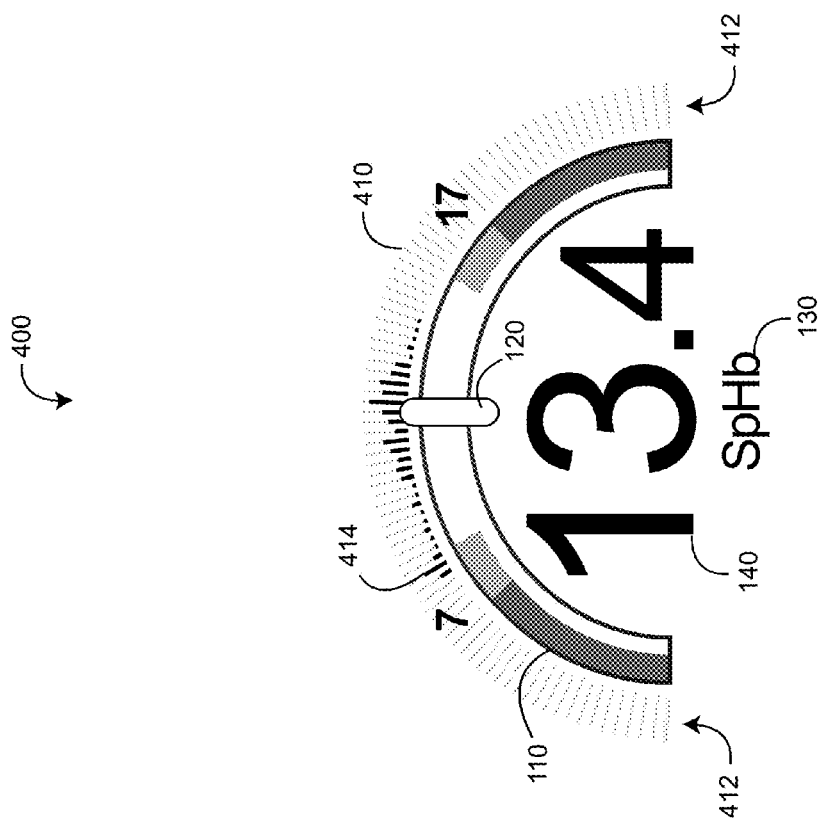
FIG. 4 is a parameter gauge illustration presenting an active histogram.

FIG. 4 illustrates a parameter gauge 400 presenting an active histogram 410. The histogram has bins 412 evenly distributed around the outer edge of the gauge face 110. The bins 412 are depicted as relatively light, radially extending lines, all of the same length. Bin fill 414 are depicted as relatively dark lines of various lengths coextending with particular ones of the bins 412. The histogram 410 advantageously depicts the amount of time the indicator 120 persists at a given parameter value corresponding to a bin position. The greater amount of time the indicator 120 persists at a given parameter value, the further the histogram fill corresponding to that bin extends from the inner edge to the outer edge of the histogram scale. In an embodiment, the histogram 410 extends the full travel range of the indicator 120.

Figure 5:
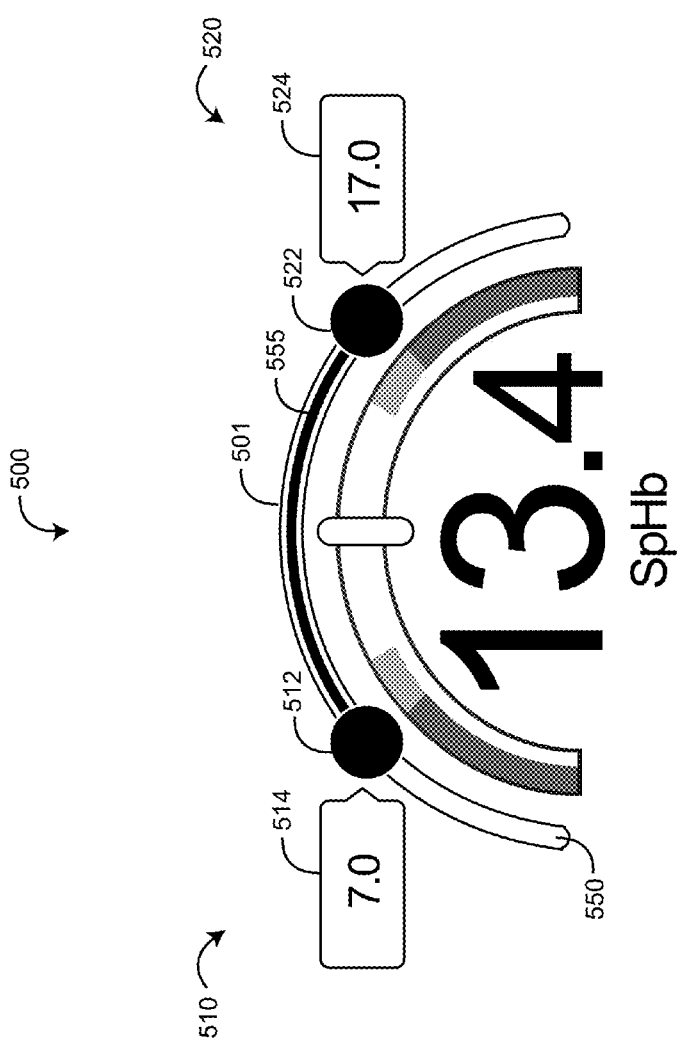
FIG. 5 is a parameter gauge illustration presenting an alarm limit editor.

FIG. 5 illustrates a parameter gauge 500 presenting an alarm limit editor. When a user touches an alarm limit number, e.g. 152 (FIG. 1), the alarm limit number and histogram (if enabled) fades out. These are replaced by a dual knob slider 501. The slider 501 has a decreasing value (relative to the center) left side 510 and an increasing value (relative to the center) right side 520. Accordingly, the slider 501 has a corresponding left side knob 512, left side label 514, right side knob 522 and right side label 524. A user can slide each knob 512, 522 with a finger along a slider carve 550. Each label 514, 524 will track with the corresponding knob 512, 522 position, and the value depicted on each label 514, 524 will update as the corresponding knob is moved. The color (red) alarm bars also track and move with the knobs 512, 522. The between-the-knobs carve portion 555 is also colored (black) so as to help identify the knob positions.

Half gauges, such as 101 (FIG. 1) and 103 (FIG. 1) having a single (decreasing or increasing) range have a single knob and label accordingly.

Figure 6:
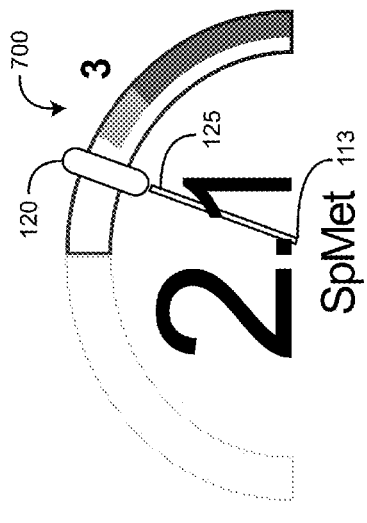
FIG. 6 is a parameter gauge illustration presenting a 3-dimensional edge.
Figure 7:
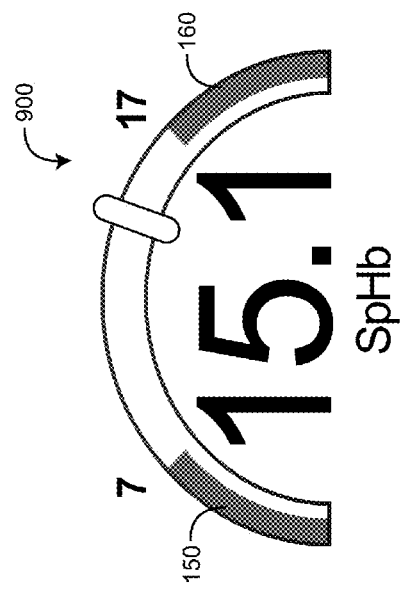
FIG. 7 is a parameter gauge illustration presenting a visible needle indicator.
Figure 8:
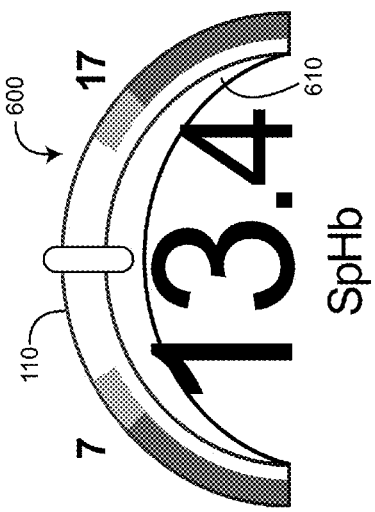
FIG. 8 is a quarter-circle parameter gauge illustration.
Figure 9:
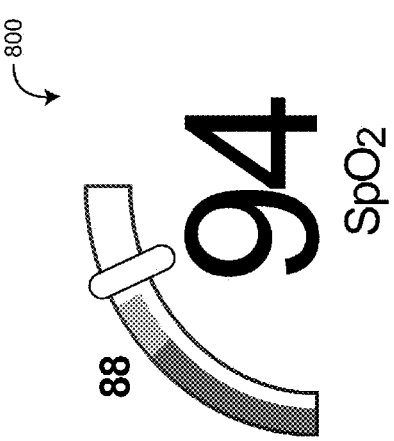
FIG. 9 is a parameter gauge illustration presenting single (red zone) alarm limits.

FIGS. 6-9 each illustrate various other parameter gauge embodiments. FIG. 6 illustrates a parameter gauge 600 having a gauge face 110 with an apparent edge 610 so as to appear three-dimensional. FIG. 7 illustrates a parameter gauge 700 with an indicator 120 that sits atop a visible needle 125. The needle 125 and corresponding indicator 120 rotate about a gauge center 113. FIG. 8 illustrates a quarter-circle parameter gauge 800, i.e. a gauge without a ghost face 190 (FIG. 1) to indicate an inactive gauge portion. FIG. 9 illustrates a parameter gauge 900 having only red zone alarm regions 150, 160, i.e. without cautionary yellow zone regions 170, 180 (FIG. 1).

A physiological monitor gauge panel has been disclosed in detail in connection with various embodiments. These embodiments are disclosed by way of examples only and are not to be construed as limiting the scope of the claims that follow. One of ordinary skill in the art will appreciate many variations and modifications.

What is claimed is:

1. A pulse oximeter comprising:
   a noninvasive sensor that when positioned proximate a measurement site on a monitored patient is configured to output signals responsive to light attenuated by body tissue at the measurement site of the monitored patient;
   a signal processor and a display processor, the signal processor configured to process the output signals to determine measurement values responsive to an oxygen saturation of arterial blood of the monitored patient, the display processor configured to receive the measurement values; and
   a display responsive to the display processor to present display indicia to a caregiver, the display indicia being responsive to said determined measurement values and the display indicia comprising a gauge panel, the gauge panel comprising:
      a gauge face formed as an arc including lowered end portions and a raised center portion between said lowered end portions, said raised center portion including an approximate top center, said gauge face including an active face portion and an inactive face portion, said active face portion including a plurality of positions along said arc, each position mapped to a percentage or range of percentages of said determined measurement values of said oxygen saturation so that the active face portion sweeps through a range of the measurement values, said plurality of positions including positions corresponding to a low range of said determined measurement values, positions corresponding to a cautionary range of said determined measurement values, and positions corresponding to a normal range of said determined measurement values, wherein a top center position of said plurality of positions is located at said approximate top center of said raised center portion of said arc and said top center position corresponds to at least one optimum value of said determined measurement values and corresponds to one end of said active face portion of said arc, said inactive face portion corresponding to an unused portion of the arc of said gauge face;
      a digital readout set to a numeric value of a current value of said determined measurement values, said digital readout substantially centered underneath said arc, at least a portion of said digital readout also between said lowered end portions, said active face portion of said arc generally positioned above an approximate side half of the digital readout;

a parameter indicator set to a type of physiological parameter, said type of physiological parameter including oxygen saturation; and some or all of a radially extending indicator positioned to extend from beneath said top center position radially toward said arc, said radially extending indicator terminating proximate said arc with a designator portion identifying where said current value of said determined measurement values falls along said plurality of positions along said arc.

2. The pulse oximeter according to claim 1, wherein said gauge face further comprises an arced color bar disposed along the arc of said gauge face proximate at least one of the lowered end portions, said color bar indicating an alarm region for said determined measurement values.

3. The pulse oximeter according to claim 2, wherein said gauge face further comprises a second arced color bar disposed along the arc of said gauge face indicating a cautionary region for said determined measurement values.

4. The pulse oximeter according to claim 1, wherein said gauge face further comprises further comprising a histogram having an arcing base disposed along the arc of said gauge face, the histogram including a plurality of bar graphs, each bar graph having a size corresponding to an amount of time said determined measurement values were within a range represented by said bar graph.

5. The pulse oximeter according to claim 1, wherein portions of said gauge face are configured to change from a first non-red color to a red color in response to said determined measurement values being within an alarm range.

6. A pulse oximeter including a display configured to present measurement data to a caregiver through a plurality of gauge faces, the pulse oximeter comprising:

a noninvasive sensor that when positioned proximate a measurement site on a monitored patient is configured to output signals responsive to light attenuated by body tissue at the measurement site of the monitored patient;

a signal processor and a display processor, the signal processor configured to process the output signals to determine measurement values responsive to a plurality of physiological parameters of the monitored patient, the display processor configured to receive said determined measurement values; and a display responsive to the display processor to present display indicia to a caregiver, the display indicia being responsive to said determined measurement values and the display indicia comprising a plurality of gauge panels, wherein said plurality of gauge panels including a first gauge panel and a second gauge panel, the first gauge panel comprising:

a first face formed as a first arc including first lowered end portions and a first raised center portion between said first lowered end portions, said first raised center portion including an approximate first top center, said first face including a first active face portion defining the first arc, said first active face portion including a plurality of positions along said first arc, each position mapped to a percentage or range of percentages of one of said determined measurement values so that a sweep through the first active face portion sweeps through a range of possible measurement values for said one of said determined measurement values, said plurality of positions including ones of said positions corresponding to a low range of said determined measurement values for one of said plurality of physiological parameters, others of said positions corresponding to a cautionary range of said determined measurement values for said one of said plurality of physiological parameters; and still others of said positions corresponding to a normal range of said determined measurement values for said one of said plurality of physiological parameters, wherein a first top center position of said plurality of positions is located at said first top center and corresponds to at least one of optimum values of said determined measurement values for one of said plurality of physiological parameters, a first digital readout set to a numeric value of a current measurement of said one of said determined measurement values for said one of said plurality of physiological parameters, said first digital readout substantially centered underneath said first arc and at least a portion thereof between said first lowered end portions, and a first parameter indicator set to a type of parameter, the second gauge panel including:

a second face formed as a second arc substantially the same size as the first arc, said second arc including second lowered end portions and a second raised center portion between said second lowered end portions, said second raised center portion including a second approximate top center, said second face including a second active face portion and an inactive face portion, said second active face portion including a plurality of positions along said second arc, each position mapped to a percentage or range of percentages of said determined measurement values of another of said plurality of physiological parameters so that a sweep through the second active face portion sweeps through a range of possible measurement values for another of said plurality of physiological parameters, said plurality of positions including ones of said positions corresponding to a low range of said determined measurement values, others of said positions corresponding to a cautionary range of said determined measurement values, and still others of said positions corresponding to a normal range of said determined measurement values, wherein a second top center position of said plurality of positions is located in said second top center of said second raised center portion of said second arc and said second top center position corresponds to a maximum value of said determined measurement values, and corresponds to one end of said second active portion of said second arc, wherein said inactive portion corresponding to an unused portion of the second gauge face;

a second digital readout set to a numeric value of a current measurement of said determined measurement values, said second digital readout substantially centered underneath said second arc, where the second active face portion of said second arc is generally positioned above a side half of the second digital readout; and a second parameter indicator set to a type of parameter.

7. The pulse oximeter according to claim 6, wherein said first gauge face further comprises some or all of a first radially extending indicator positioned to extend from beneath said first top center position radially toward said first arc, said first radially extending indicator terminating proximate said first arc with a first designator portion identifying where said current value of said determined measurement values falls along said plurality of positions along said first arc.

8. The pulse oximeter according to claim 6, wherein said first gauge face further comprises some or all of a first radially extending indicator positioned to extend from beneath said first top center position radially toward said first arc, said first radially extending indicator terminating proximate said first arc with a first designator portion identifying where said current value of said determined measurement values falls along said plurality of positions along said first arc.

* * * * *